US007768679B2

(12) United States Patent
Yamaguchi

(10) Patent No.: US 7,768,679 B2
(45) Date of Patent: Aug. 3, 2010

(54) CARRIAGE MOVING DEVICE AND IMAGE-SCANNING APPARATUS USING THE SAME

(75) Inventor: Hiroshi Yamaguchi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 695 days.

(21) Appl. No.: 11/677,355

(22) Filed: Feb. 21, 2007

(65) Prior Publication Data

US 2007/0195139 A1 Aug. 23, 2007

(30) Foreign Application Priority Data

Feb. 21, 2006 (JP) ............................ 2006-043859

(51) Int. Cl.
*H04N 1/04* (2006.01)

(52) U.S. Cl. ........................ 358/497; 358/474; 358/483

(58) Field of Classification Search ................. 358/497, 358/494, 474, 471, 505, 501, 483; 399/211, 399/212; 250/239, 216, 234–236; 382/312, 382/318, 319; 235/454
See application file for complete search history.

(56) References Cited

U.S. PATENT DOCUMENTS 5,999,277 A * 12/1999 Tsai ........................... 358/498
6,468,456 B1 10/2002 Webber et al.
6,888,651 B2 * 5/2005 Lee ............................ 358/497
7,385,736 B2 * 6/2008 Tseng et al. ................ 358/497
7,486,423 B2 * 2/2009 Chang et al. ................ 358/497
7,554,701 B2 * 6/2009 Hong et al. ................. 358/474
2003/0030851 A1 2/2003 Lee
2004/0091298 A1 5/2004 Nellen
2005/0001875 A1 1/2005 Ueda et al.
2006/0126131 A1 6/2006 Tseng et al.
2007/0081203 A1 4/2007 Matsuyama et al.

FOREIGN PATENT DOCUMENTS

| | | |
|---|---|---|
| JP | 01-072358 | 5/1989 |
| JP | 5-147300 | 6/1993 |
| JP | 2000-218631 | 8/2000 |
| JP | 2002-019211 | 1/2002 |
| JP | 2004-155190 | 6/2004 |
| JP | 2004-322538 | 11/2004 |
| JP | 2004-345187 | 12/2004 |

OTHER PUBLICATIONS

Notification of Reasons of Refusal for Japanese Patent Application 2006-043859 mailed on Dec. 15, 2009.

* cited by examiner

*Primary Examiner*—Cheukfan Lee
(74) *Attorney, Agent, or Firm*—Banner & Witcoff, Ltd

(57) ABSTRACT

According to one example structure of the invention, a carriage moving device includes; a guide member comprising a pair of inclined planes; a carriage slidably supported by the guide member in a longitudinal direction of the guide member at a plurality of portions where the pair of inclined planes slidably support the carriage.

10 Claims, 14 Drawing Sheets

CARRIAGE MOVING DEVICE AND IMAGE-SCANNING APPARATUS USING THE SAME

CROSS-REFERENCE TO RELATED APPLICATIONS

This application is based on and claims the benefit of priority from the prior Japanese Patent Application No. 2006-043859, filed on Feb. 21, 2007; the entire contents of which are incorporated herein by reference.

TECHNICAL FIELD

The present invention relates to a carriage moving device movably and slidably supporting a carriage, which incorporates an object to be moved, by a long-sized guide member disposed downward of the carriage in the longitudinal direction of the guide member, and the present invention relates to an image scanning apparatus provided with the carriage moving device and in particular relates to a carriage supporting structure by a guide member.

BACKGROUND

FIG. 13 is a sectional view showing the major parts of a related-art image-scanning apparatus 131. The image-scanning apparatus 131 includes a casing 132 and an image-scanning unit 133 disposed in the casing 132. Contact glass 134 on which a document is placed is provided on the upper surface of the casing 132. The image-scanning unit 133 includes a contact image sensor (CIS) 136 and a carriage 135, and is constructed so that the contact image sensor 136 is held on the carriage 135. A long-sized guide shaft 138 is constructed on the casing 132. The guide shaft 138 is composed of a round bar-shaped metallic axis. The carriage 135 is supported movably and slidably in the direction perpendicular to the paper of the same drawing. A linkage portion 139 is provided at the lower part of the carriage 135, and a timing belt of a drive mechanism (not illustrated) is connected to the linkage portion 139. Therefore, the image-scanning unit 133 can scan an image of a document by scanning the document placed on the contact glass 134 while moving in the above-described direction. A roller unit 137 is provided at both end sides of the image-scanning unit 133. The roller unit 137 is contact with the rear side of the contact glass 134 and supports smooth movements of the image-scanning unit 133.

FIG. 14 is a detailed enlarged view of a supporting portion (portion enclosed by a broken line in FIG. 13) of the carriage 135 by the guide shaft 138. A groove 140 having a larger width than the diameter of the guide shaft 138 is provided at the lower part of the carriage 135. The bottom side of the groove 140 has a horizontal plane 143 and a pair of inclination planes 142*a* and 142*b* inclined so as to have a fan shape from both ends of the corresponding horizontal plane 143, and perpendicular planes 141*a* and 141*b* continued to the inclination planes 142*a* and 142*b*, respectively, are formed to the lower side of the carriage 135. The carriage 135 is supported by the groove 140 being fitted onto the guide shaft 138. The carriage 135 is supported at two points of tangential lines 144*a* and 144*b* (that is, the tangential lines extending in the perpendicular direction of paper in FIG. 14) of the circumferential surface of the guide shaft 138 and the inclination planes 142*a* and 142*b*. Therefore, there is no case where any backlash is generated in the radial direction of the guide shaft 138.

However, JP-A-5-147300 discloses that a supporting structure supports the carrier frame (11) by fitting a round bar-shaped guide shaft (14) into the carrier frame (11) having an inverted U-shaped sleeve (13). (See FIG. 1 of JP-A-5-147300.) However, with the corresponding supporting structure, it is necessary to increase the width of the sleeve (13) larger than the diameter of the guide shaft (14) in order to movably and slidably support the carrier frame (11). For this reason, play is generated between the surface of the sleeve (13) and the circumferential surface of the guide shaft (14), and backlash is brought about in the radial direction of the guide shaft (14). This backlash is not preferable in view of producing distortion in a read image. Since the sleeve (13) slides while keeping surface contact with the guide shaft (14), the sliding resistance is large, resulting in a problem by which smooth sliding movement is hindered. Therefore, in recent years, the supporting structure shown in FIG. 13 and FIG. 14, which is described above, has been mainly employed. Also, in the above description, reference numerals used in FIG. 1 of JP-A-5-147300 are shown in brackets for convenience.

When the supporting structure of the carriage 135 shown in FIG. 13 and FIG. 14 is employed, it is necessary to set the clearance between two tangential lines 144*a* and 144*b* more than a predetermined width in order to achieve stable sliding movement of the carriage 135. The inclination planes 142*a* and 142*b* are necessarily spaced, and also the width of the groove 140 are widened. The diameter of the guide shaft 138 is increased. However, in case that the diameter of the guide shaft 138 is increased to become large, the height of the supporting structure is necessarily elongated in the perpendicular direction, and the scale of the supporting structure is made large-sized.

SUMMARY

The present invention has been made in view of the above circumstances and provides a carriage moving device and an image-scanning apparatus using the same. According to an aspect of the present invention, a carriage supporting mechanism and the image-scanning apparatus using the same can stabilize a support of the carriage and can prevent the scale of the carriage in its height direction from increasing.

DESCRIPTION OF THE EXAMPLE STRUCTURE

First Example Structure

Hereinafter, a first example structure of the invention is described with reference to the accompanying drawings.

Also, the following example structure is only an example in which the invention is embodied, and the example structure may be appropriately subjected to modifications within the scope not departing from the aspect of the invention.

Figure 1:
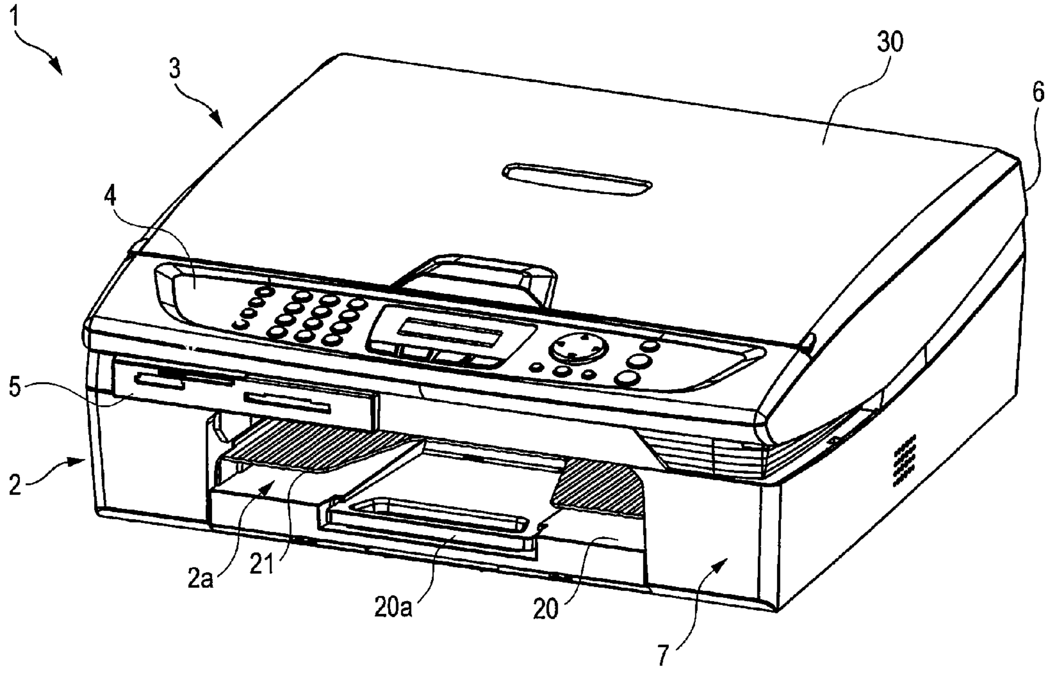
FIG. 1 is an exemplary perspective view showing a configuration of a multifunction printer according to a first example structure.
Figure 2:
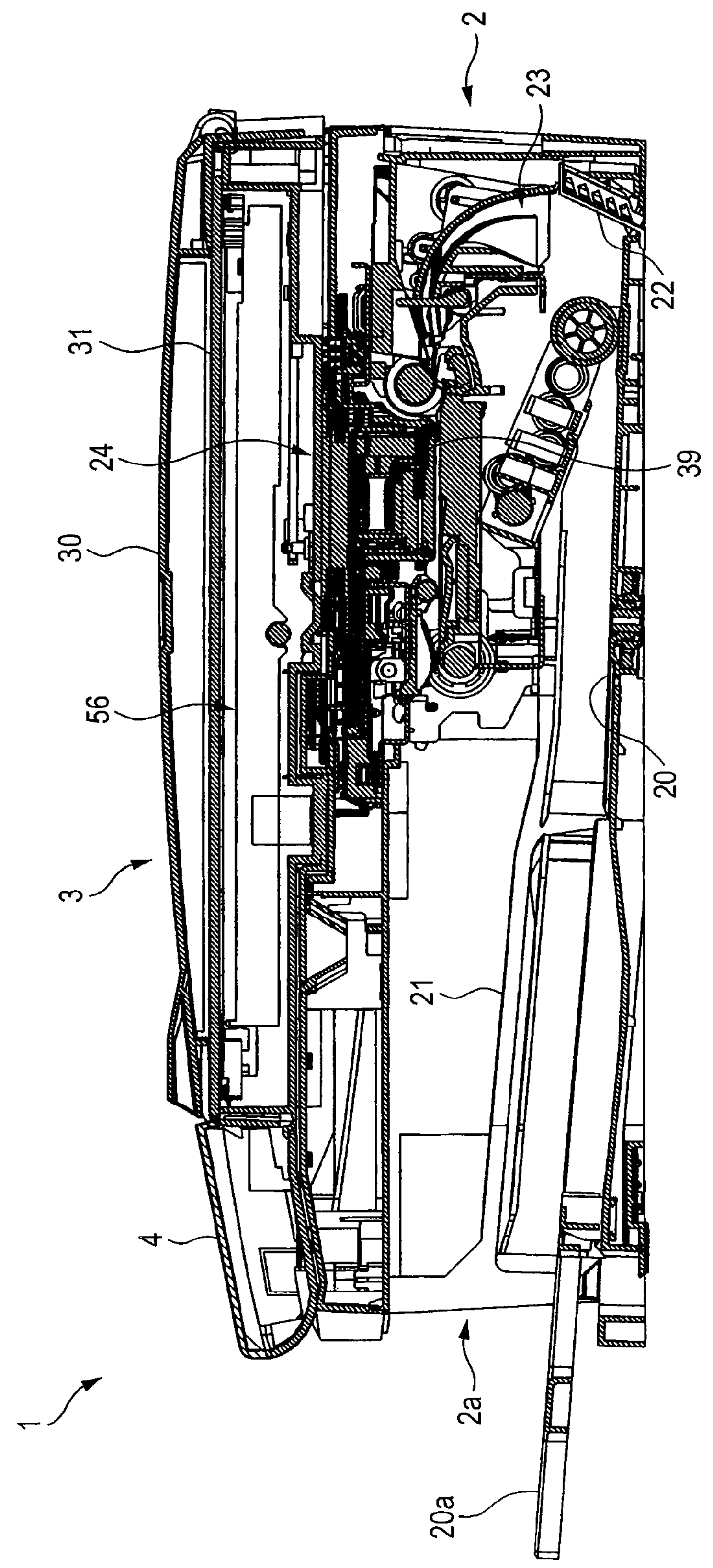
FIG. 2 is an exemplary longitudinal sectional view showing the internal configuration of the multifunction printer 1.

FIG. 1 is an exemplary perspective view showing a configuration of a multifunction printer 1 according to the first example structure. FIG. 2 is an exemplary longitudinal sectional view showing the internal configuration of the multifunction printer 1.

The multifunction printer 1 is a multi-function device (MFD) integrally provided with a printer section 2 at the lower part thereof and a scanner section 3 at the upper part thereof, and has a printer function, a scanner function, a copying function, and a facsimile function. The scanner section 3 of the multifunction printer 1 corresponds to an image-scanning apparatus pertaining to the example structure. Therefore, functions in addition to the scanner function are optional, for example, an image-scanning apparatus according to the example structure may be embodied as a mono-function scanner that is not provided with any printer section 2 and does not have any printer function, copying function and facsimile function.

The multifunction printer 1 is connected to an external device such as a computer. The multifunction printer 1 carries out a process (a printer function) of scanning an image and a document on a sheet in the printer section 2 based on the recording data including image data and document data, which are transmitted from the corresponding external device. In addition, the multifunction printer 1 carries out a process (a facsimile function) of transferring an image of a document scanned by the scanner section 3 to a communications device connected via a telephone line, etc., and a process (a scanner function) of transferring the scanned image to a storage device such as a hard disk drive (HDD), etc., and the above-described external device. Further, the multifunction printer 1 can carry out a so-called copying process (a copying function) of printing an image of a document, which is scanned by the scanner section 3, on a sheet in the printer section 2.

As shown in FIG. 1, the multifunction printer 1 presents roughly a wide and thin appearance of a rectangular parallelepiped the width and depth of which are larger than the height, wherein the lower part of the multifunction printer 1 is the printer section 2. The printer section 2 has an opening **2*a* formed at its front side. A sheet discharging tray 21 is arranged above the sheet feeding tray 20 and inside the opening 2*a*. The sheet feeding tray 20 accommodates various sizes of sheet such as, for example, A4 size, B5 size and postcard size, etc. By drawing out a slide tray 20*a* as necessary as shown in FIG. 2, the tray surface of the sheet feeding tray 20 can be enlarged, so that the sheet, such as legal size paper can be accommodated therein. A sheet accommodated in the sheet feeding tray 20 is fed to the interior of the printer section 2, have a desired image printed thereon, and is discharged to the sheet discharging tray 21**.

The upper part of the multifunction printer 1 is the scanner section 3. The scanner section 3 may be configured as a so-called flat-bed scanner (FBS). As shown in FIG. 1 and FIG. 2, the scanner section 3 includes a document cover 30 that opens/closes with respect to the document scanning base 6. The document cover 30 is attached to the scanner section 3 by hinges (not illustrated) at the rear side of the scanner section 3. As shown in FIG. 2, contact glass 31 is disposed on the upper surface of the document scanning base 6. An image-scanning unit 56 includes an image sensor that scans in a depth direction (the left and right direction in FIG. 2) of the multifunction printer 1 as a main scanning direction. The image-scanning unit 56 is provided downward of the contact glass 31 so that the image-scanning unit can reciprocate in the width direction (the direction perpendicular to paper in FIG. 2) of the multifunction printer 1.

An operation panel 4 to operate the printer section 2 and the scanner section 3 is provided on the front upper part of the multifunction printer 1. The operation panel 4 has various types of operation buttons and a liquid crystal display portion. The multifunction printer 1 operates based on operation at the operation panel 4. When the multifunction printer 1 is connected to an external computer, the multifunction printer 1 may operate based on instructions transmitted from the corresponding computer via a printer driver or a scanner driver. A slot section 5 is provided at the left upper part of the front side of the multifunction printer 1. Various types of small-sized memory cards may be inserted into the slot section 5. Image data stored in the small-sized memory card inserted into the slot section 5 are read by predetermined operations at the operation panel 4. Information regarding the image data read out from the small-sized memory card is displayed on the liquid crystal display portion of the operation panel 4. A user may print out an optional image on the sheet by the printer section 2 based on the information displayed on the corresponding liquid crystal display portion.

An internal configuration of the printer section 2 of the multifunction printer 1 is described with reference to FIGS. 2 and 3. As shown in FIG. 2, the sheet feeding tray 20 is provided on the bottom side of the multifunction printer 1, and an inclined separator 22 is provided in the inner side of the sheet feeding tray 20. The inclined separator 22 made of a plate separates the sheet double-conveyed from the sheet feeding tray 20 and guides the uppermost sheet upwards. A conveying path 23 of the sheet is turned to a front side of the multifunction printer 1 after being turned upwards from the inclined separator 22, extends from the rear side of the multifunction printer 1 to the front side thereof and goes to the sheet discharging tray 21 via a platen 42 provided downward of the image-printing unit 24. The sheet accommodated in the sheet feeding tray 20 is guided so as to make a U-turn from downward to upward by the conveying path 23 of the sheet, and the sheet conveyed from the sheet feeding tray 20 reaches the image-printing unit 24. Then, the sheet is discharged to the sheet discharging tray 21 after images are printed on the sheet by the image-printing unit 24.

Figure 3:
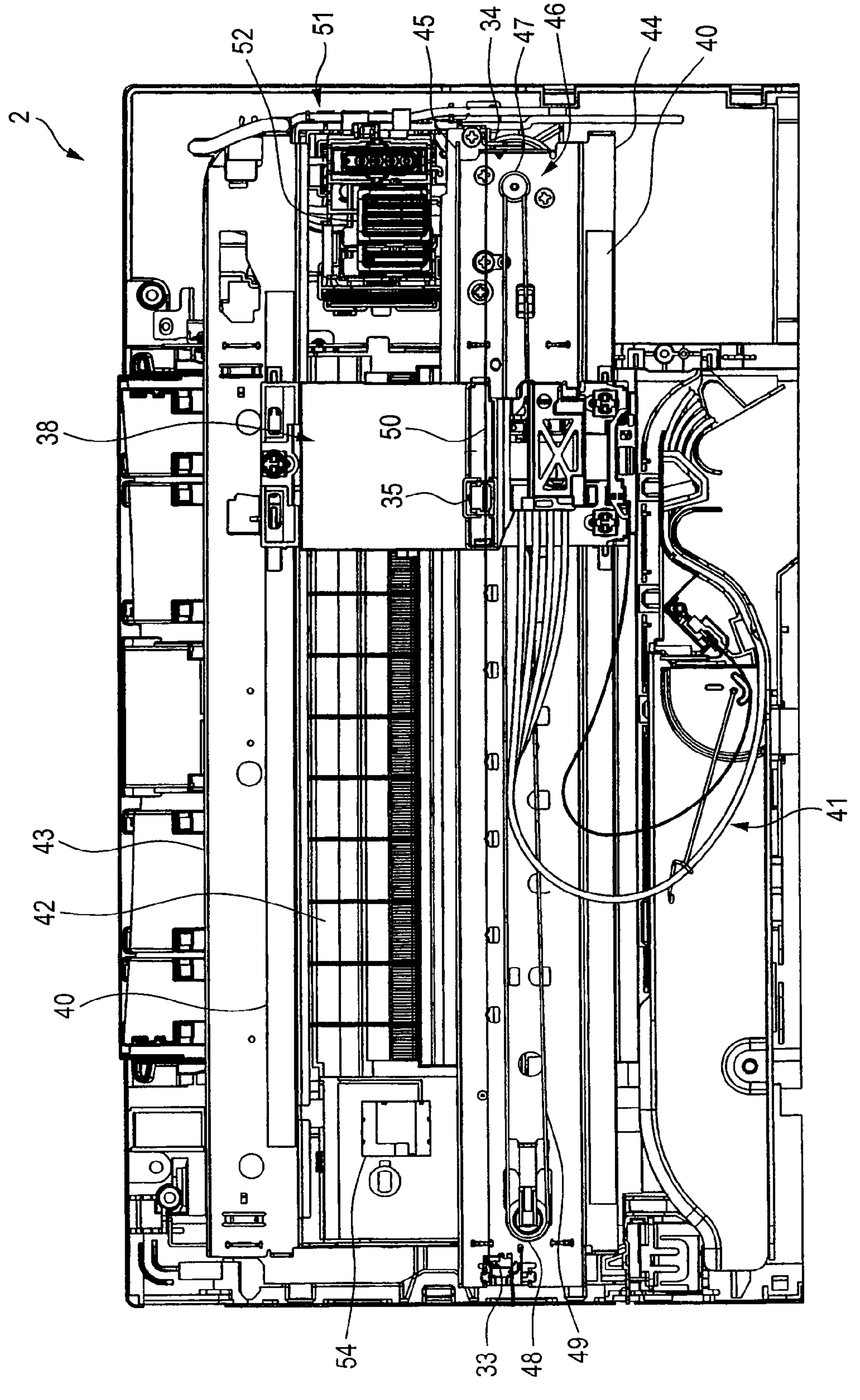
FIG. 3 is an exemplary plan view showing the major configuration of a printer section 2.

As shown in FIG. 2 and FIG. 3, the image-printing unit 24 is provided on the conveying path 23 of the sheet. The image-printing unit 24 includes a carriage 38 (See FIG. 3) including a ink-jet print head 39 (Refer to FIG. 2). The carriage 38 reciprocates in the main scanning direction. Respective colors of inks, cyan (C), magenta (M), yellow (Y) and black (Bk) are supplied to the ink-jet print head 39 through an ink tube 41 (Refer to FIG. 3) from an ink cartridge disposed independently from the ink-jet print head 39 in the multifunction printer 1. While the carriage 38 is reciprocating, the respective colors of inks are selectively discharged from the ink-jet print head 39 as fine ink drops. Accordingly, an image is printed on the sheet conveyed on the platen 42. In FIG. 2 and FIG. 3, respective ink cartridges in which the respective colors of inks are stored are not illustrated.

As shown in FIG. 3, a pair of guide rails 43, 44 are provided to be spaced from each other with a predetermined distance in the conveying direction (that is, the direction from upside to downside in FIG. 3) of the sheet. The guide rails 43, 44 extend in a direction (the left and right direction in FIG. 3) orthogonal to the conveying direction of the sheet. The guide rails 43, 44 are provided in a casing of the printer section 2 and partly form the frame supporting the members that configures the printer section 2. The carriage 38 is slidable in the direction orthogonal to the conveying direction of the sheet so as to cross over the guide rails 43 and 44. Thus, since the guide rails 43 and 44 are horizontally arranged in the conveying direction of the sheet, the height of the printer section 2 can be made lower to make the apparatus thin.

The guide rail 43 disposed at the upstream side in the conveying direction of the sheet is flat-shaped, wherein the length of the width direction (the left and right direction in FIG. 3) thereof in the conveying path 23 is longer than the range of reciprocating motion of the carriage 38. A slide tape 40 is adhered to the upper surface of the guide rail 43 along the edge portion at the downstream side in the conveying direction. The slide tape 40 functions to reduce sliding friction with the carriage 38, wherein the end portion of the carriage 38 at the upstream side in the conveying direction is placed on the slide tape 40 and the end portion thereof slides in the longitudinal direction of the slide tape 40.

The guide rail 44 disposed at the downstream side in the conveying direction of the sheet is substantially flat-shaped. The length of the guide rail 44 along the width direction of the conveying path 23 is substantially the same as the length of the guide rail 43. A slide tape 40 is adhered onto the upper surface of the guide rail 44 along the edge portion at the downstream side in the conveying direction of the sheet. The end portion of the carriage 38 at the downstream side in the conveying direction of the sheet is placed on the slide tape 40 and is caused to slide in the longitudinal direction of the slide tape 40. The edge portion 45 of the guide rail 44 at the upstream side in the conveying direction is turned upward to form a substantially right angle. The carriage 38 carried by the guide rails 43 and 44 slidably holds the edge portion 45 between the holding members such as a pair of rollers, etc. Therefore, the carriage 38 is positioned with respect to the conveying direction of the sheet, and the carriage 38 is slidable in the direction orthogonal to the conveying direction of the sheet.

A belt drive mechanism 46 is disposed on the upper surface of the guide rail 44. The belt drive mechanism 46 includes an endless annular timing belt. The endless annular timing belt has teeth at inner side thereof and is applied between a drive pulley 47 and a driven pulley 48, which are respectively provided in the vicinity of both ends in the width direction of the conveying path 23 of the sheet. A motor (not illustrated) is connected to the shaft of the drive pulley 47, since a drive force is inputted by the motor, the drive pulley 47 is rotated. Upon receiving the rotation force thereof, the timing belt 49 rotates. A belt having both ends at which the carriage 38 is fixed may be used in addition to an endless annular belt for the timing belt 49.

The carriage 38 is fixed at the timing belt 49 at its bottom side. Therefore, the carriage 38 reciprocates on the guide rails 43 and 44 while using the edge portion 45 as a reference, based on rotating motions of the timing belt 49. The ink-jet print head 39 (Refer to FIG. 2) is incorporated in such a carriage 38. Therefore, the ink-jet print head 39 reciprocates with reciprocating motion of the carriage 38 along the width direction of the conveying path 23 of the sheet as a main scanning direction.

An encoder strip 50 of a linear encoder (not illustrated) is disposed on the guide rail 44. The encoder strip 50 is made of transparent resin and is substantially band-shaped. A pair of supporting portions 33 and 34 are formed so as to be erected from the upper surface of the guide rail 44 at both the ends in the width direction (that is, the reciprocating direction of the carriage 38) of the guide rail 44. The encoder strip 50 is engaged with the supporting portions 33 and 34 at both end portions of the encoder strip 50. The encoder strip 50 is applied along the edge portion 45.

The encoder strip 50 has a light transmitting portion for transmitting light and a light shielding portion for shielding light. A pattern where the light transmitting portion and the light shielding portion are disposed by turns at a predetermined pitch in the longitudinal direction is marked on the encoder strip 50. An optical sensor 35 is a transmission type sensor. The optical sensor 35 is disposed at a position corresponding to the encoder strip 50 on the upper surface of the carriage 38. The optical sensor 35 reciprocates along the longitudinal direction of the encoder strip 50 together with the carriage 38, and the optical sensor 35 detects the pattern of the encoder strip 50 while reciprocating. The ink-jet print head 39 has a substrate for controlling discharge of inks. The substrate outputs pulse signals based on detection signals of the optical sensor 35, wherein the position and speed of the carriage 38 are judged on the basis of the pulse signals, and the reciprocating motion of the carriage 38 is controlled. Further, since the substrate is covered by the head cover of the carriage 38, it is not illustrated in FIG. 3.

As shown in FIG. 3, maintenance units such as a purge mechanism 51 and a waste ink tray 54, etc., are disposed in a range where no sheet passes through, that is, outside the range where an image is recorded by the ink-jet print head 39. The purge mechanism 51 absorbs and removes air bubbles and foreign substances from the nozzles of the ink-jet print head 39. The purge mechanism 51 includes a cap 52 for covering the nozzles of the ink-jet print head 39, a pump mechanism connected to the ink-jet print head 39 via the cap 52, and a moving mechanism to bring the cap 52 into contact with the nozzles of the ink-jet print head 39 and separate it therefrom. Also, since the pump mechanism and the moving mechanism are located below the guide rail 44, these are not illustrated in FIG. 3. When absorbing and removing air bubbles, etc., from the ink-jet print head 39, the carriage 38 is moved so that the ink-jet print head 39 is positioned above the cap 52. In this state, the cap 52 is moved upwards and is closely adhered to the underside of the ink-jet print head 39. Accordingly, the cap 52 seals the nozzles. When the interior of the cap 52 receives negative pressure from the pump mechanism, the nozzles of the ink-jet print head 39 absorbs ink. Air bubbles and foreign substances in the nozzles are absorbed and removed along with the absorbed ink.

The waste ink tray 54 receives empty discharge of ink from the ink-jet print head 39, so-called flushing. The waste ink tray 54 is in the range of reciprocating motion but outside the range of recording images on the upper surface of the platen 42. In addition, since felt is in the waste ink tray 54, flushed ink is absorbed in the corresponding felt. By these maintenance units, maintenance, for example, air bubbles can be removed, and ink is mixed in the ink-jet print head 39 and drying, etc is prevented.

As shown in FIG. 1, a casing of the printer section 2 has a door 7 at a front side thereof. The door 7 is openable and closeable. When the door 7 is opened, the cartridge-mounting portion is exposed to the front side of the apparatus, and the ink cartridge can be taken out and mounted. The cartridge-mounting portion is divided into four accommodation chambers corresponding to ink cartridges although not illustrated. The ink cartridges holding respective colors of inks, cyan, magenta, yellow and black are accommodated in the respective accommodation chambers. Four ink tubes 41 corresponding to respective colors of inks are routed from the cartridge-mounting portion to the carriage 38. Respective colors of inks are supplied from the ink cartridges mounted in the cartridge-mounting portion to the ink-jet print head 39 incorporated in the carriage 38 via the respective ink tubes 41.

Figure 4:
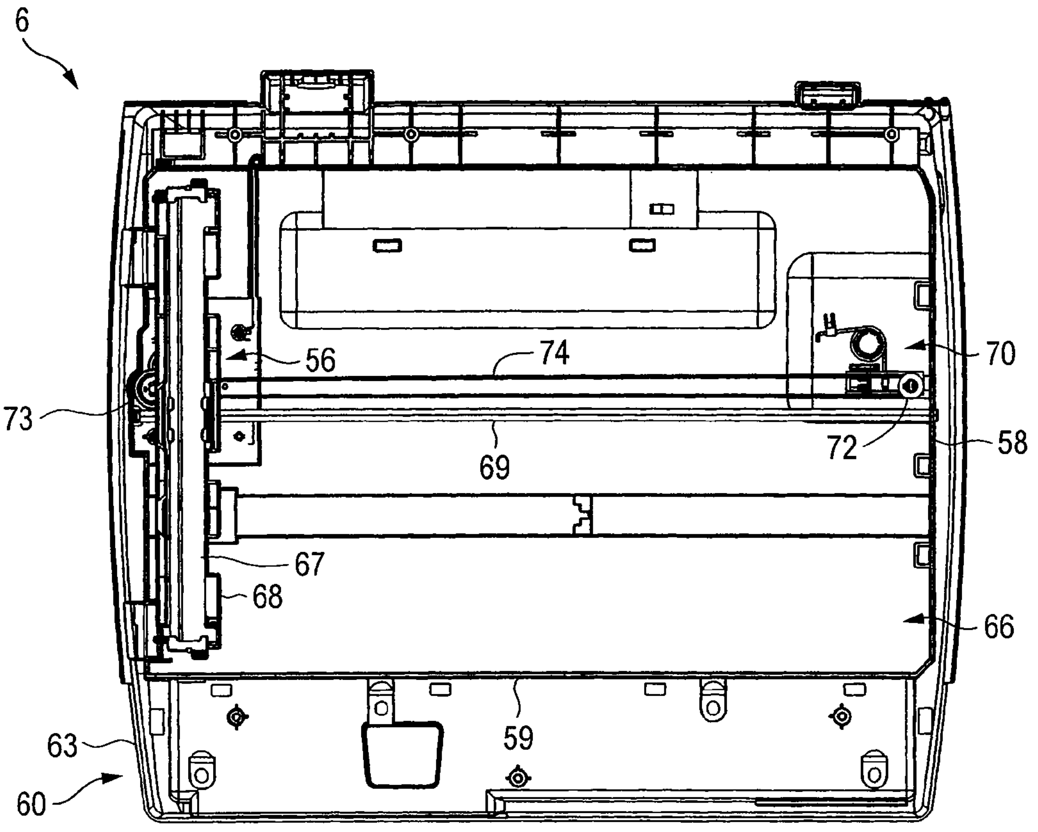
FIG. 4 is an exemplary plan view showing the major configuration of a scanner section 3.
Figure 5:
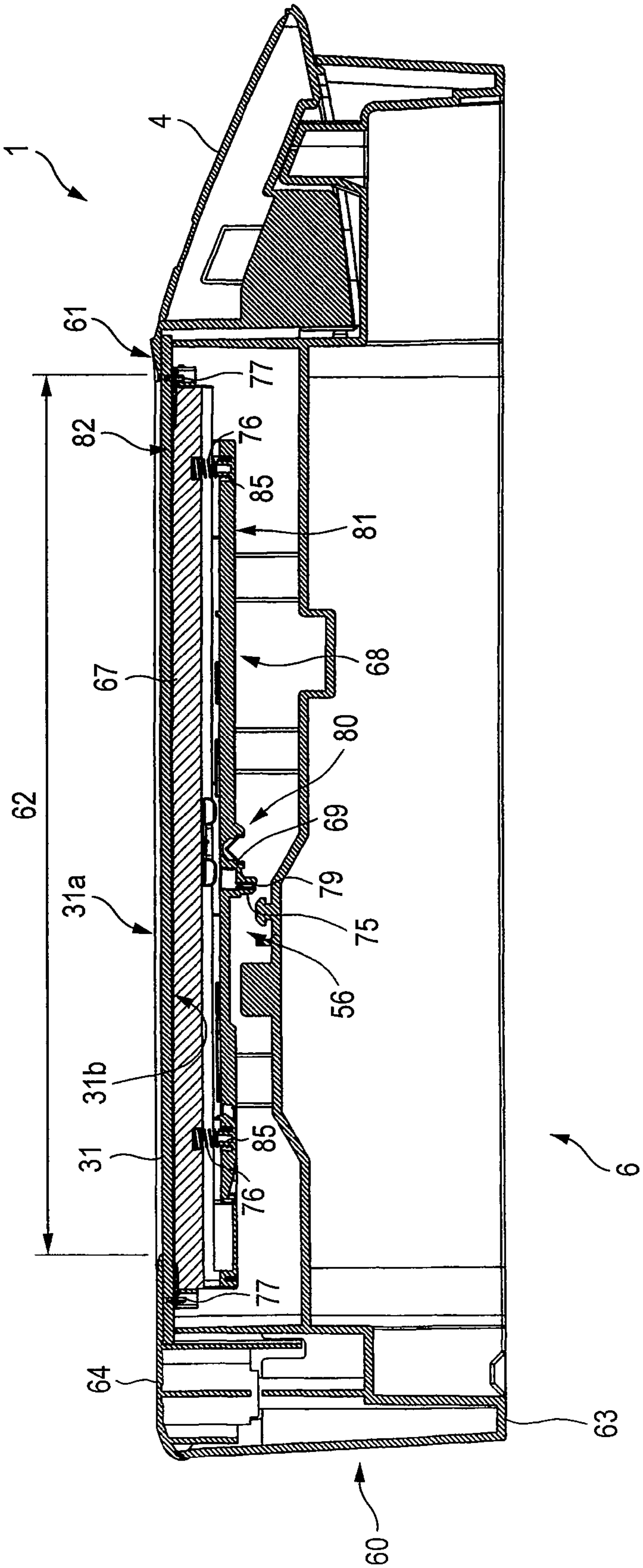
FIG. 5 is an exemplary longitudinal sectional view showing the internal configuration of the scanner section 3.
Figure 6:
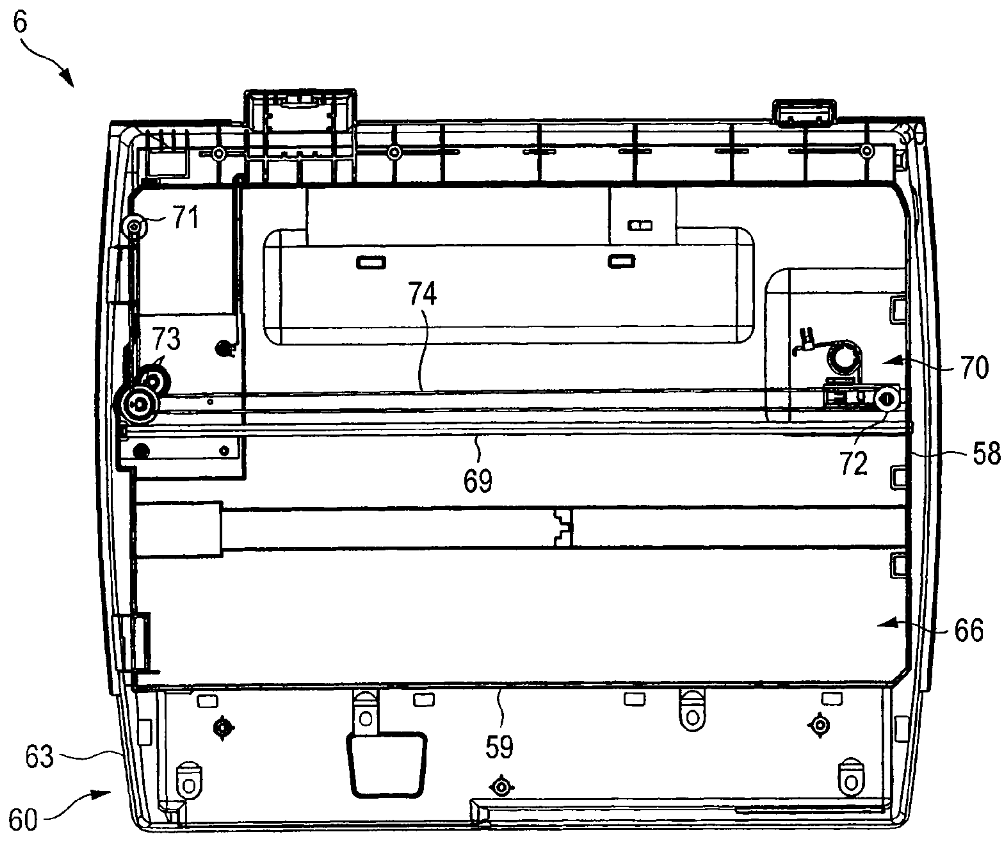
FIG. 6 is an exemplary plan view of a document scanning base 6, which shows a configuration of the belt drive mechanism 70.

Next, referring to FIG. 4 through FIG. 6, a description is given of the internal constitution of the scanner section 3 of the multifunction printer 1.

As shown in FIG. 4, the main body frame 60 of the document scanning base 6 includes a vessel-shaped lower frame 63 with its upper surface 61 open, and an upper cover 64 having an opening 62 on the upper surface 61. The main body frame 60 is configured by fitting the upper cover 64 onto the lower frame 63. The contact glass 31 is attached to the upper cover 64 so as to be exposed to the opening 62. The surface 31*a* of the contact glass 31 configures a document placing plane sectioned by the opening 62.

As shown in FIG. 5, an image-scanning unit 56 is disposed in the lower frame 63. Both the lower frame 63 and the upper frame 64 are made of synthetic resin. The lower frame 63 includes a base portion 66 to constitute the bottom plate, a side wall 58 erected from the surrounding of the base portion 66, and a partition plate 59. Both the lower frame 63 and the upper frame 63 are integrally formed together. The partition plate 59 partitions an area in which the image-scanning unit 56 is disposed and an area in which substrates, etc., of the operation panel 4 are disposed. The lower frame 63 includes a supporting rib to support the contact glass 31, a boss portion for fixing various types of members with screws, and a through-hole, etc., for electric wiring, etc. However, since these parts may be appropriately designed in compliance with examples of the document scanning base 6, a detailed description thereof is omitted.

The image-scanning unit 56 includes a contact image sensor 67 (corresponding to a moving object), which is one example of image-scanning unit, and a long and slender rectangular parallelepiped carriage 68. The contact image sensor 67 is a so-called sensor in which a light source is caused to emit light, light is irradiated onto a document, the light reflected from the document is guided to a photoelectric transducer by lenses, and the photoelectric transducer outputs electric signals in response to the intensity of reflection light. The contact image sensor 67 is incorporated in the carriage 68 and is caused to reciprocate downward of the contact glass 31. The image-scanning unit 56 is movably supported in the direction (hereinafter called a “sub-scanning direction”) orthogonal to the longitudinal direction of the carriage 68 downwards of the contact glass 31 by fitting the carriage 68 onto a guide shaft 69 (corresponding to the guide member) installed over the width direction of the lower frame 63 as described later.

As shown in FIG. 5, the carriage 68 incorporates the contact image sensor 67 so as to be carried on the upper surface thereof. A shaft receiving portion 80 that is fitted onto the guide shaft 69 so as to cross over the guide shaft 69 front upward is formed on the underside of the carriage 68. Since the shaft receiving portion 80 and the guide shaft 69 are fitted to each other, the carriage 68 is carried by the guide shaft 69. Therefore, the carriage 68 is slidable in the axial direction of the guide shaft 69. A connection portion 75 protrudes downward at the side of the shaft receiving portion 80. Since the connection portion 75 grasps the timing belt 74 of the belt drive mechanism 70 described later, the timing belt 74 and the carriage 68 are connected to each other. Accordingly, a drive force is transmitted from the belt drive mechanism 70 to the carriage 68, and the carriage 68 moves on the guide shaft 69.

Figure 7:
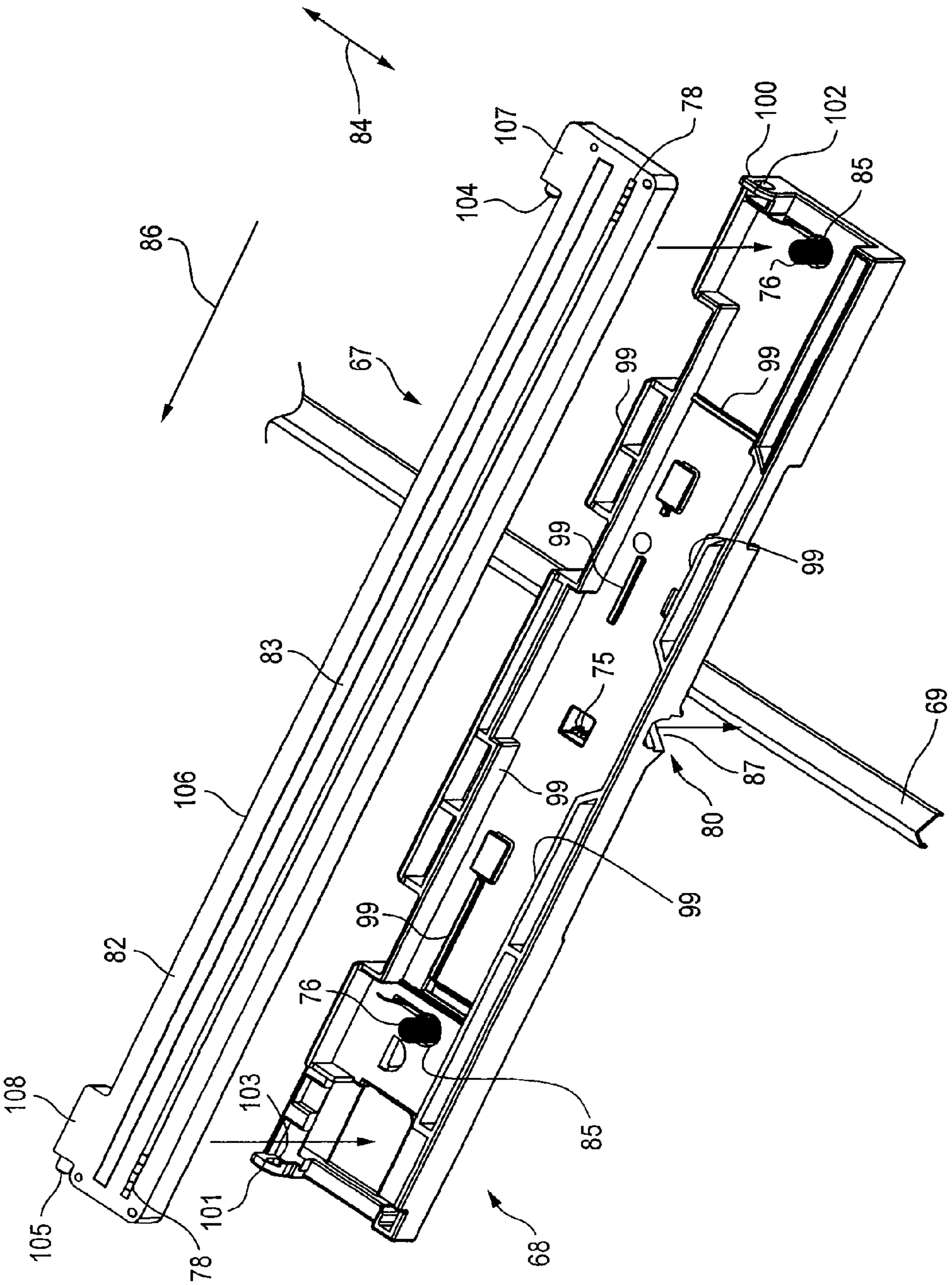
FIG. 7 is an exemplary enlarged perspective view showing the major parts of the image-scanning unit 56, which is a disassembled perspective view before the carriage 68 is fitted onto the guide shaft 69.

A spring receiving portion 85 is formed at two left and right portions inside the bottom portion of the carriage 68 (Refer to FIG. 5 and FIG. 7). Coil springs 76 are positioned by the spring receiving portions 85 and intervene between the contact image sensor 67 and the carriage 68. The carriage 68 is resiliently pressed to the contact glass 31 side by the coil springs 76. Accordingly, the contact image sensor 67 incorporated in the carriage 58 is closely adhered to the rear side 31*a* of the contact glass 31 so as to be pressed thereto. The contact image sensor has a roller unit 77 at both end sides thereof. When the contact image sensor 67 is pressed to the rear side 31*b* of the contact glass 31, the contact image sensor 67 smoothly moves in line with movement of carriage 68, while being adhered to the rear side 31*b* of the contact glass 31, by the roller units 77.

As shown in FIG. 4, a belt drive mechanism 70 having a guide shaft 69 is provided downward of the image-scanning unit 56, that is, downward of the carriage 68. The guide shaft 69 is installed over the entire width of the lower frame 63 in the sub-scanning direction parallel to the rear side 31*b* of the contact glass 31 as shown in the same drawing. The driven by the belt drive mechanism 70 is slidable on the guide shaft 69. A carriage moving device is served as a mechanism in which the carriage 68 moves slidably along the guide shaft 69 by the belt drive mechanism 70 while supporting the carriage 68

As shown in FIG. 6, the belt drive mechanism 70 includes a drive pulley 71, a driven pulley 72, a timing belt 74 installed therebetween, and a motor (not illustrated). The timing belt 74 is an endless belt on the inside of which teeth are formed. The motor is connected to the shaft of the drive pulley 71. Since the motor rotates the drive pulley 71, the timing belt 74 makes a rotating motion upon receiving the rotations.

The drive pulley 71 is disposed at the back-left side of the lower frame 63. The timing belt 74 installed on the drive pulley 71 extends to the front side of the lower frame 63, and the timing belt 74 is installed on an intermediate pulley 73 disposed at the front of the guide shaft 69. The timing belt 74 is turned to substantially form a right angle and extend to the right end of the lower frame 63 along the guide shaft 69. The timing belt 74 is installed onto the driven pulley 72 disposed in the vicinity of the right end of the lower frame 63. As shown in FIG. 6, the timing belt 74 is installed to be substantially L-shaped between the drive pulley 71 and the driven pulley 72. The portion of the timing belt 74 between the driven pulley 72 and the intermediate pulley 73, that is, the portion along the guide shaft 69 is grasped by the connection portion 75 (Refer to FIG. 5) of the carriage 68. Accordingly, the timing belt 74 and the carriage 68 are connected to each other. The timing belt 74 may be a belt having ends, both ends of which are fixed at the carriage 68 in addition to an endless belt.

Subsequently, with reference to FIG. 7 through FIG. 10, a detailed description is given of the guide shaft 69 and a supporting structure of the carriage 68 by the corresponding guide shaft 69.

Figure 8:
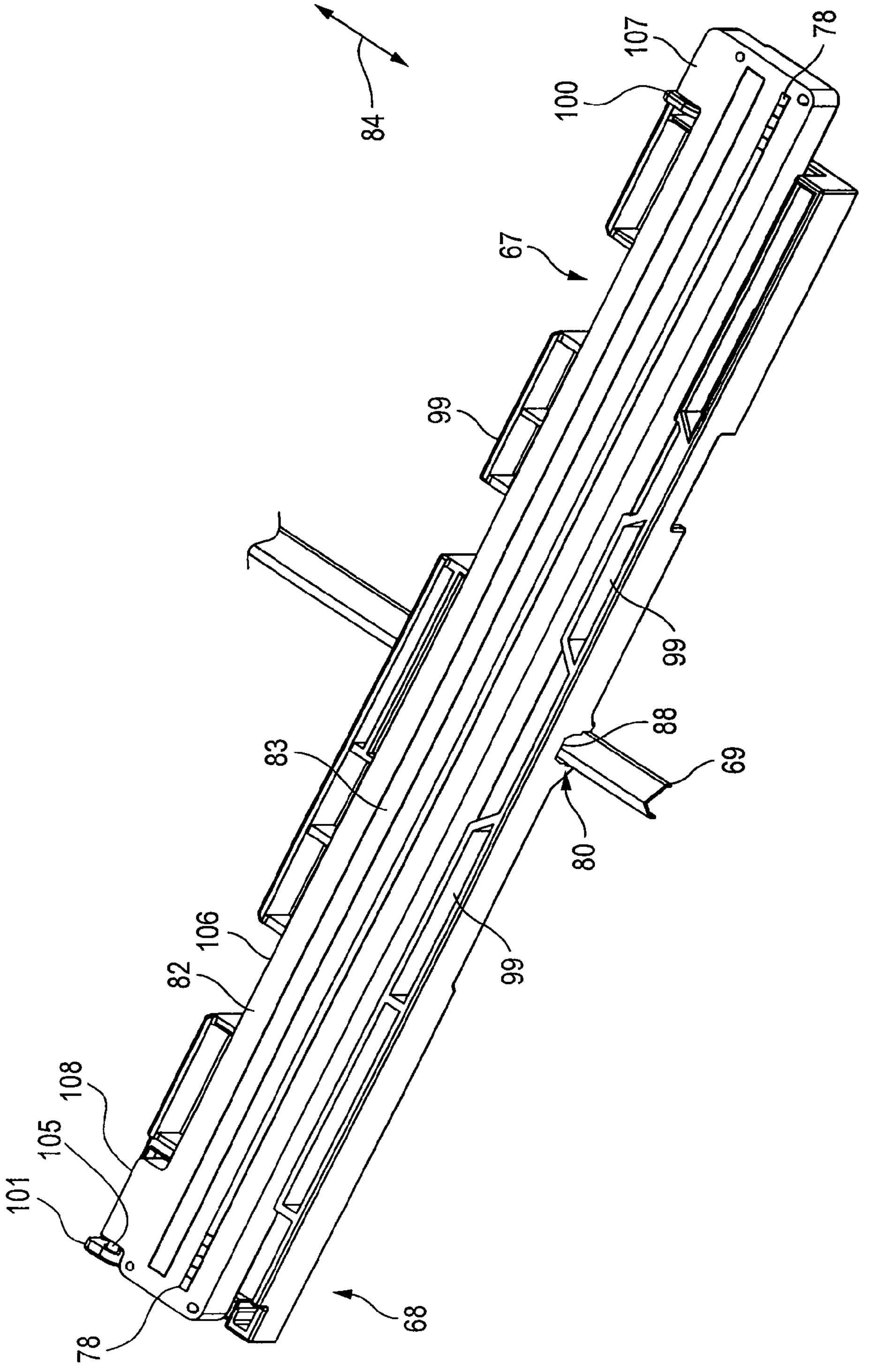
FIG. 8 is an exemplary enlarged perspective view showing the major parts of the image-scanning unit 56, which is a perspective view showing a state where the carriage 68 is fitted onto the guide shaft 69.
Figure 9:
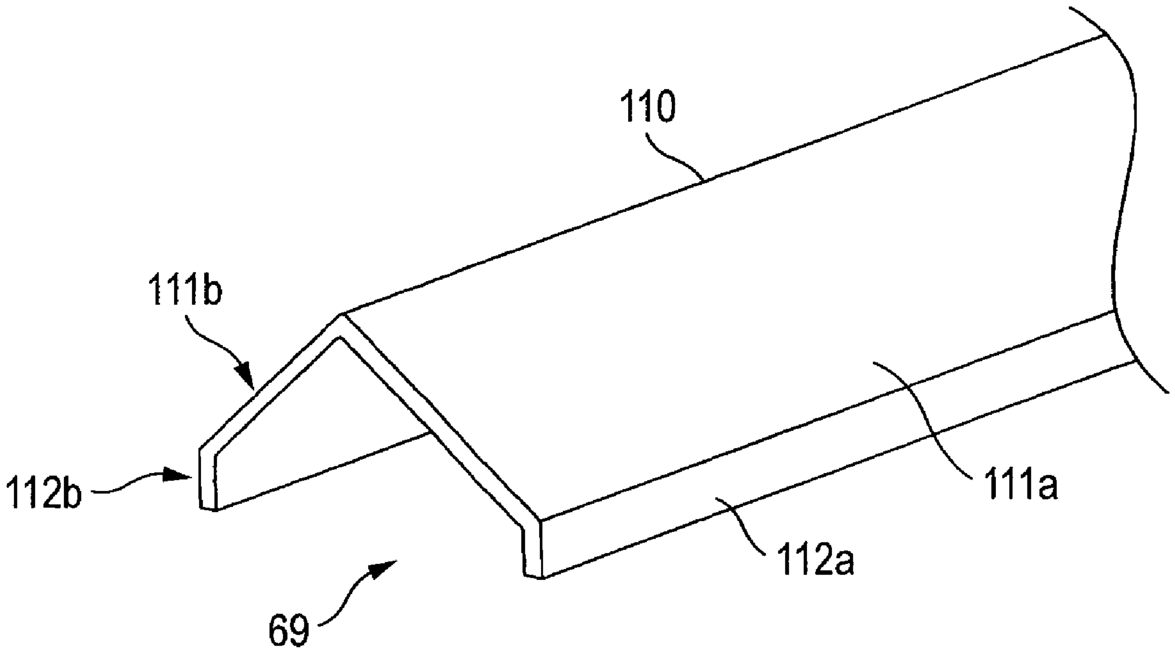
FIG. 9 is an exemplary and partially enlarged perspective view of the guide shaft 69.

As shown in FIG. 7 and FIG. 8, the image-scanning unit 56 includes a carriage 68 and a contact image sensor 67 held in the corresponding carriage 68. The carriage 68 is substantially box-shape. The carriage 68 is composed of, for example, synthetic resin and is formed to be like a vessel whose upper surface is open. In the carriage 68, a rigidity is secured to stably hold the contact image sensor 67. In detail, as shown in FIG. 7, ribs 99 are appropriately provided on the sidewall portion and the bottom portion of the carriage 68 integrally therewith. Also, locking portions 100 and 101 are provided in the inner side corner portions of the carriage 68 integrally therewith. The locking portions 100 and 101 are provided with holes 102 and 103 penetrated in the longitudinal direction. The holes 102 and 103 extend in the vertical direction. That is, the holes 102 and 103 are formed as a long slot extending in the direction of contacting to and separating from the contact glass 31. And, locking pins 104 and 105 of the contact image sensor 67 are fitted into the holes 102 and 103, whereby the contact image sensor 67 is fixed at the carriage 68.

The contact image sensor 67 includes a casing 106, a light source (light source portion) (not illustrated), which is provided in the corresponding casing 106, and a light receiving element (light receiving portion). The casing 106 is formed of, for example, synthetic resin, and is formed to be box-shape as shown in FIG. 7 and FIG. 8. The casing 106 internally incorporates the light source and the light receiving element. The upper surface 82 of the casing 106 is opposed to the rear side 31*b* of the contact glass 31 (Refer to FIG. 5). Therefore, the light source and the light receiving element are close to and opposed to the rear side 31*b* of the contact glass 31.

Typically, the light source includes an LED (light-emitting diode) and a light guide 83. The LED is not illustrated in the same drawing. However, it is disposed inside the casing 106. Typically, the light guide 83 is made of transparent synthetic resin and extends entirely in the longitudinal direction of the casing 106. The light guide 83 is exposed at the upper surface 82 of the casing 106, and light emitted from the LED is guided entirely in the longitudinal direction of the casing 106 by the light guide 83. Therefore, the light emitted from the LED is substantially uniformly dispersed entirely in the longitudinal direction of the casing 106 and is irradiated onto a document.

In the example structure, the casing 106 includes a plurality of light receiving elements. The respective light receiving elements are juxtaposed on the inner bottom portion of the casing 106 in the longitudinal direction of the corresponding casing 106. Respective light receiving elements are provided with condenser lenses 78. The condenser lenses 78 are exposed at the upper surface 82 of the casing 106. Light irradiated onto a document and reflected therefrom is condensed by the condenser lenses 78, and is received by respective light receiving elements corresponding thereto. These light receiving elements are photoelectric transducers, and output electric signals based on the corresponding received light. The electric signals are image signals of an image expressed on the document.

The casing 106 includes the above-described locking pins 104 and 105. The locking pins 104 and 105 extend in the longitudinal direction along the side surface in the inner side of the casing 106. The locking pins 104 and 105 protrude at the base portions 107 and 108 formed at the side in the inner side thereof.

The locking pins 104 and 105 are fitted into the holes 102 and 103 by being slid in the direction of the arrow 86 (Refer to FIG. 7) after the positions thereof are matched to the holes 102 and 103 secured at the locking portions 100 and 101 of the carriage 68. In this state, the contact image sensor 67 is rotatable centering around the locking pins 104 and 105, and can vary its posture between an erected position and a falling-down position with respect to the carriage 68 using the corresponding locking pins 104 and 105 as the center of vertical movement. Further, since the holes 102 and 103 are formed to be a long slot, the locking pins 104 and 105 are able to slide in the up and down directions. As a result, the contact image sensor 67 is capable of contacting to and separating from the corresponding contact glass 31 in a state where the upper surface 82 thereof maintains a parallel state to the rear side 31*b* of the contact glass 31.

As shown in FIG. 7 and FIG. 8, a connection portion 75 and a shaft receiving portion 80 are provided on the underside 81 (Refer to FIG. 5) of the carriage 68. The shaft receiving portion 80 is provided roughly at the middle in the longitudinal direction of the carriage 68.

The shaft receiving portion 80 has a groove 87 (served as the contact portion) extending in the short direction of the carriage 68. Since the groove 87 is fitted onto the guide shaft 69, the carriage 68 is supported by the guide shaft 69.

Also, the connection portion 75 is provided at a position slightly shifted to the rear side of the apparatus from the shaft receiving portion 80 (Refer to FIG. 5). The connection portion 75 corresponds to the position to which the timing belt 74 (Refer to FIG. 6) is installed. A notch 79 (Refer to FIG. 5) having a predetermined width is formed at the connection portion 75, and the timing belt 74 is held in the corresponding notch 79, and the timing belt 74 is grasped and held by the connection portion 75. Accordingly, a drive force that causes the carriage 68 to slide is transmitted from the belt drive mechanism 70 to the connection portion 75. When a drive force is given to the connection portion 75, the image-printing unit 56 is caused to slide in the short direction (that is, the direction of the arrow 84 in FIG. 7 and FIG. 8) of the carriage 68.

Figure 10:
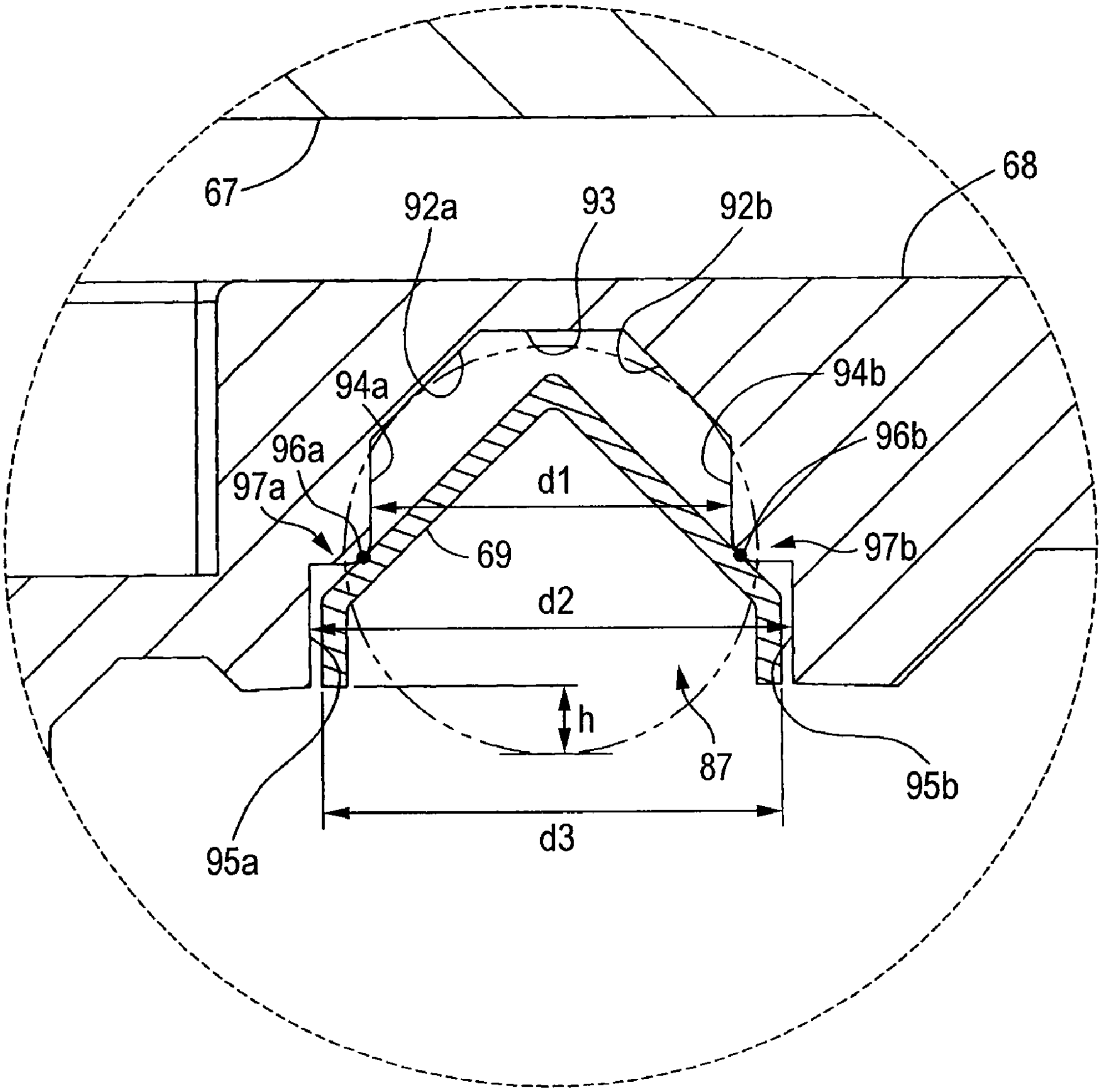
FIG. 10 is an exemplary enlarged view showing the supporting portion of the carriage 68 by the guide shaft 69.

As shown in FIG. 10, the groove 87 of the shaft receiving portion 80 presents a shape in which the groove width is stepwise widened, in its sectional view, from the bottom of the groove 87 reaching the inlet of the groove 87. In detail, as shown in the same drawing, a horizontal plane 93 extending in the short direction of the carriage 68 is provided at the middle part of the bottom of the groove 87. A pair of inclination planes 92*a* and 92*b* inclined in the direction of widening the groove width are consecutively provided at both sides, in the longitudinal direction of the carriage 68, of the horizontal plane 93. Therefore, the sectional shape of the groove 87 from the horizontal plane 93 reaching downwards takes on a folding fan shape. A pair of perpendicular planes 94*a* and 94*b* are consecutively provided perpendicularly downward from the termination ends of the inclination planes 92*a* and 92*b*. The lower ends of these perpendicular planes 94*a* and 94*b* are bent outward in the longitudinal direction. Corner portions 97*a* and 97*b* (served as the projection portions) having top portions 96*a* and 96*b* whose internal angle is roughly a right angle are formed. A pair of perpendicular planes 95*a* and 95*b* (served as the guard planes) extending perpendicularly downward from the corner portions 97*a* and 97*b* are continuously provided in the groove 87. Therefore, the width d1 between the pair of perpendicular planes 95*a* and 95*b* is made larger than the width d2 between the perpendicular planes 94*a* and 94*b*.

On the other hand, the guide shaft 69 that is fitted in the groove 87 differs in shape from a related-art type made of a metallic round bar and has substantially an inverted V shape in its sectional view. The guide shaft 69 has such a shape that a long and slender flat plate is outwardly bent. A pair of inclination planes 111*a* and 111*b* are provided at both sides of the ridgeline 110 produced by outward bending thereof. The angle formed by the inclination planes 111*a* and 111*b* is set in compliance with the detailed shape of the groove 87 of the shaft receiving portion 80, in which the guide shaft 69 is fitted. Perpendicular planes 112*a* and 112*b* are secured at the termination ends of the inclination planes 111*a* and 111*b*, that is, both edges in the width direction of the guide shaft 69, respectively. These perpendicular planes 112*a* and 112*b* are opposed to each other, and form a pair. The inward side of the guide shaft 69 is made hollow. Therefore, the weight thereof can be made lighter than that of any shaft made of metallic round bar.

The guide shaft 69 can be molded by, for example, a processing method described as sheet metal processing by which metal dies are pressed to a sheet metal to be plastically deformed. Since the guide shaft 69 is thus molded by sheet metal processing, it is possible to reduce the weight of the guide shaft 69 and finally the entire weight of the belt drive mechanism 70. In addition, the material costs can be reduced by lightening of the weight of the guide shaft 69.

As the shaft receiving portion 80 having the above-described groove 87 is fitted onto the guide shaft 69, the two points of the top portions 96*a* and 96*b* of the corner portions 97*a* and 97*b* are brought into contact with the inclination planes 111*a* and 111*b* of the guide shaft 69 as shown in FIG. 10. The ridgeline 110 of the guide shaft 69 is designed in regard to the dimension thereof so that it does not reach the horizontal plane 93 of the groove 87. Also, the perpendicular planes 95*a* and 95*b* of the groove 87 are opposed to the perpendicular planes 112*a* and 112*b* of the guide shaft 69 with predetermined clearance remaining therebetween. Therefore, as shown in the same drawing, as the groove 87 is fitted onto the guide shaft 69, the perpendicular planes 95*a* and 95*b* are opposed to each other so as to cross over the sides (perpendicular planes 112*a* and 112*b*) in the width direction of the guide shaft 69.

The width d1 between the perpendicular planes 95*a* and 95*b* is set to be larger than the width d3 between a pair of the perpendicular planes 112*a* and 112*b* of the guide shaft 69. In detail, the dimensions of the width d1 and the width d3 are designed so that, when the groove 87 is fitted onto the guide shaft 69, predetermined clearance intervenes between the perpendicular planes 95*a*, 95*b* and the perpendicular planes 112*a*, 112*b* opposed thereto, and the groove 87 is fitted with the above-described clearance. Therefore, in a state where the groove 87 is fitted onto the guide shaft 69, that is, in a state where the carriage 68 is supported by the guide shaft 69, the carriage 68 is brought into contact with the inclination planes 111*a* and 111*b* only at two points of the top portions 96*a* and 96*b*, wherein the carriage 68 is supported by the guide shaft 69 without generating any backlash. Thus, since the carriage 68 is supported in a range where the contact area is remarkably narrow, the carriage 68 is able to smoothly carry out a sliding movement on the inclination planes 111*a* and 111*b* of the guide shaft 69.

As described above, in the multifunction printer 1, the above-described structure is adopted as the supporting structure of the carriage 68, by which the carriage 68 is slidably supported by the guide shaft 69 having the inclination planes 111*a* and 111*b* while being brought into contact with the inclination planes 111*a* and 111*b* at two points of the top portions 96*a* and 96*b*. Therefore, the spacing distance of the respective inclination planes 111*a* and 111*b* may be appropriately designed to any optional profile in compliance with the shape of the above-described groove 87 regardless of the height dimension of the guide shaft 69. Accordingly, the height dimension of the guide shaft 69 is not influenced by the above-described spacing distance, whereby such a related-art inconvenience can be solved, which necessarily results in an increase in the height dimension if the width is lengthened in a case where a guide shaft made of a metallic round bar is used. As a result, stabilized supporting of the carriage 68 can be achieved, and the height of the supporting structure of the carriage 68 can be made lower. Further, to facilitate comparison with a related-art example, the sectional shape of a related-art guide shaft made of a metallic round bar is shown by a two-dot chain line in FIG. 10. As shown in the same drawing, according to the supporting structure of the example structure described above, it is possible to shorten the height dimension by "h."

In addition, an unexpected impact, for example, an impact generated when the upper surface 82 of the contact image sensor 67 runs onto a step secured on the rear side 31*b* of the contact glass 31 is given when the carriage 68 slides on the guide shaft 69, wherein there is a fear that the carriage 68 is tilted and comes off from the guide shaft 69. However, with the supporting structure according to the example structure, the perpendicular planes 95*a* and 95*b* are brought into contact with the perpendicular planes 112*a* and 112*b*, wherein the carriage 68 is prevented from being further tilted. Therefore, there is no case where the carriage 68 comes off from the guide shaft 69 due to tilting thereof.

Figure 11:
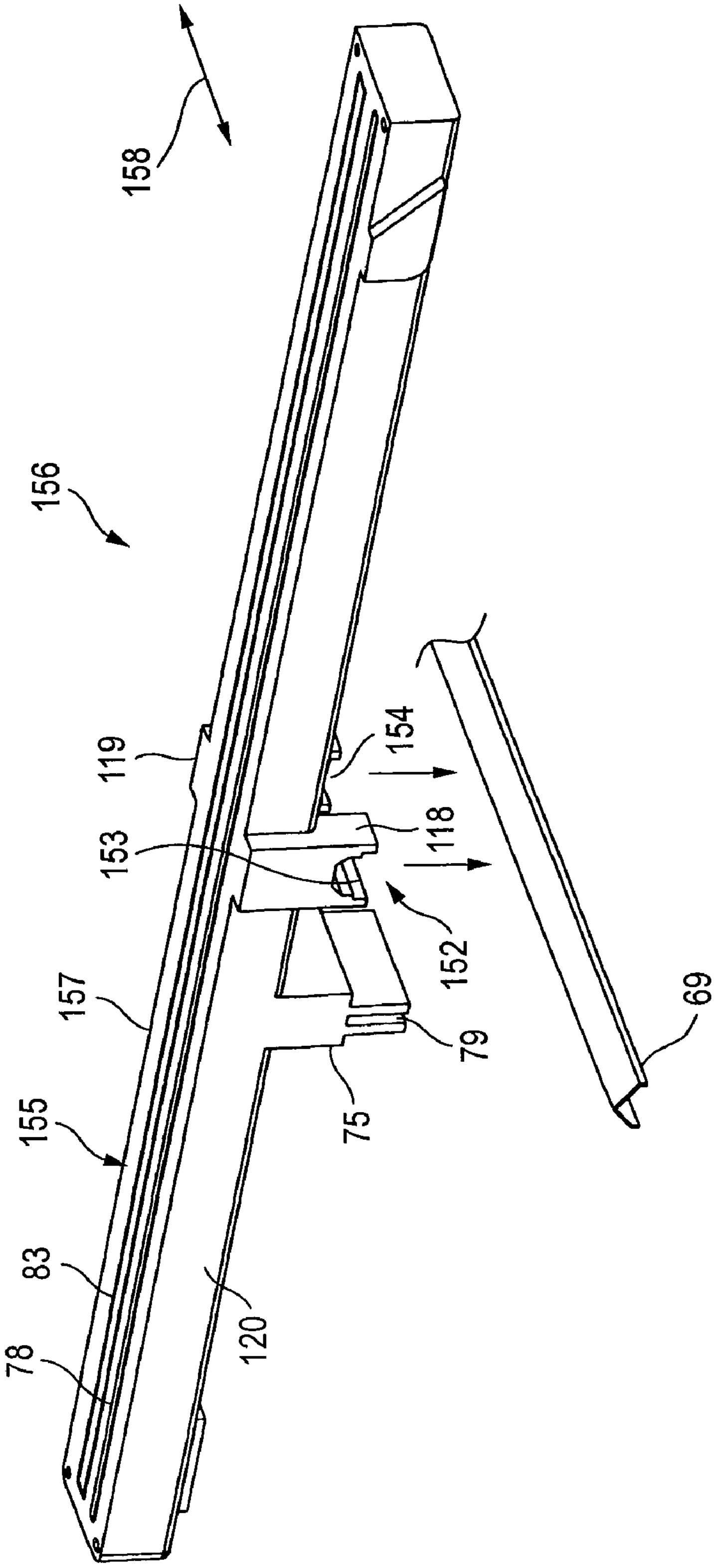
FIG. 11 is an exemplary enlarged perspective view showing the major parts of the contact image sensor 156 according to a second example structure, which is a perspective view showing a state before the contact image sensor 156 is fitted onto the guide shaft 69.
Figure 12:
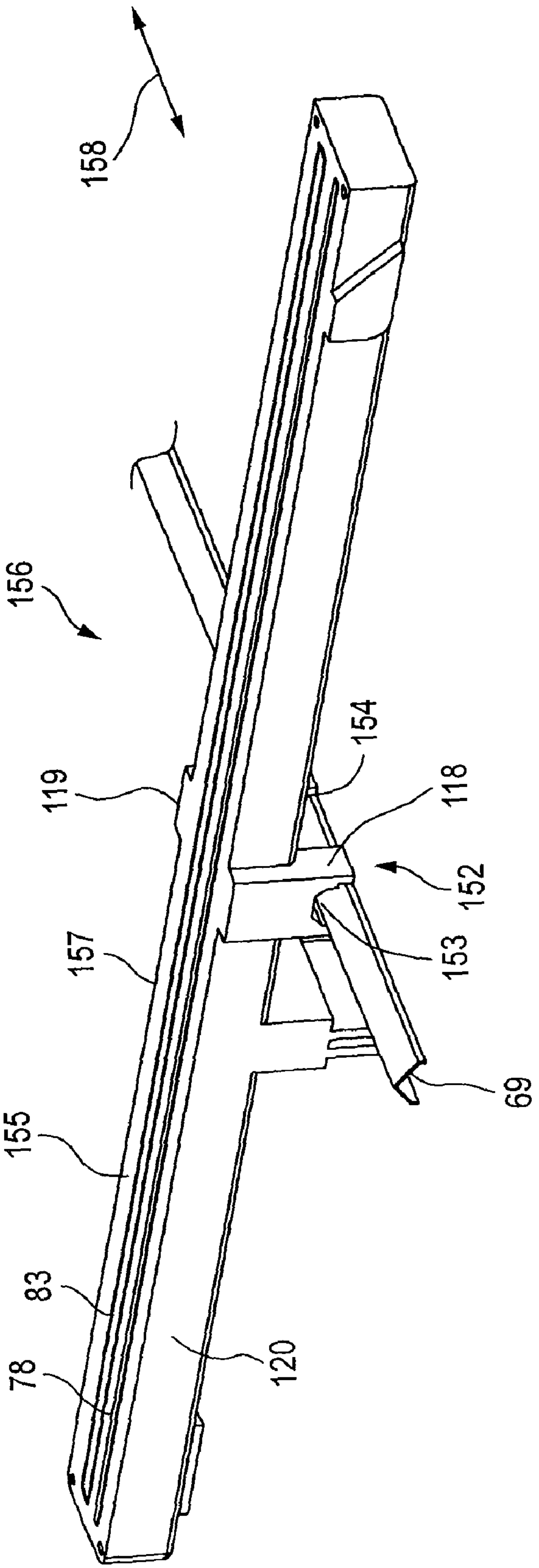
FIG. 12 is an exemplary enlarged perspective view showing the major parts of the contact image sensor 156 according to the second example structure, which is a perspective view showing a state where the contact image sensor 156 is fitted onto the guide shaft 69.
Figure 13:
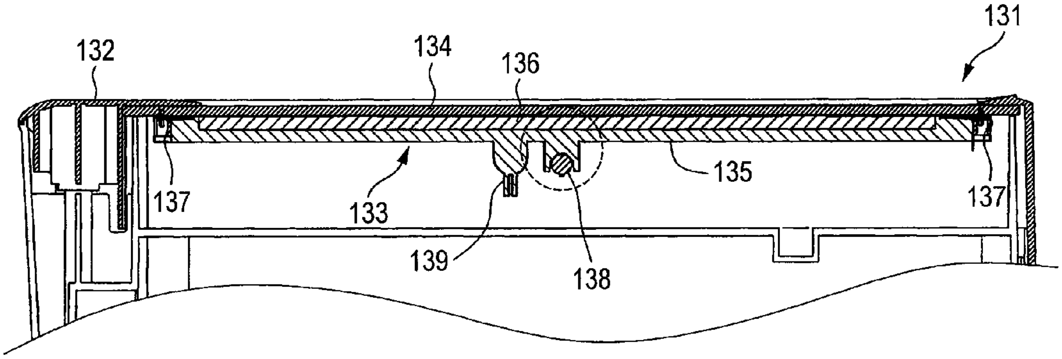
FIG. 13 Prior Art
FIG. 13 is an exemplary sectional view showing the major parts of a related-art general image-scanning device 131.
Figure 14:
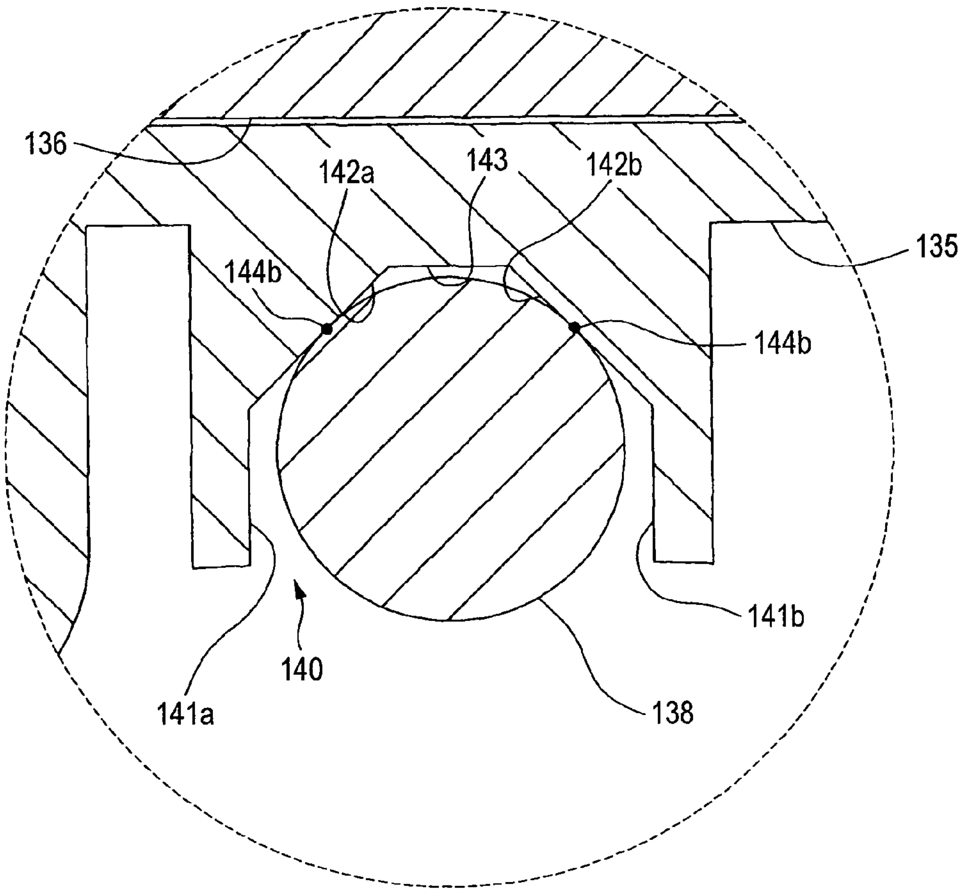
FIG. 14 Prior Art
FIG. 14 is an exemplary enlarged view showing the is supporting portion of the carriage 135 by the guide shaft 138.

Next, with reference to FIG. 11 and FIG. 12, a description is given of example structure modifies the above-described example structure. To avoid overlapping description, in modified example structure described below in detail, components that are the same as those of the example structure described above are given the same reference numerals as those in the above-described example structure, and a description thereof is omitted. Herein, FIG. 11 and FIG. 12 are enlarged perspective views showing the major parts of a contact image sensor 156 employed for the modified example structure. In the respective drawings, the belt drive mechanism 7C and electric cables excluding the guide shaft 69 are omitted.

In the example structure described above, a description was given of an example in which the contact image sensor 67 composed separately from the carriage 68 is employed as one of the image-scanning unit of the multifunction printer 1. However, in the modified example structure 2, a description is given of a supporting structure of the contact image sensor 156, in which the corresponding contact image sensor 156 having the carriage formed to be integral with the casing 157 is employed as one example of the image-scanning unit.

As shown in FIG. 11 and FIG. 12, the contact image sensor 156 includes a casing 157, and a light source (light source portion) and a light receiving element (light receiving portion), which are not illustrated but are internally incorporated in the corresponding casing 157. The contact image sensor 156 is common to the contact image sensor 67 described above in this point. Also, these sensors are common to each other in that the casing 157 is made of, for example, synthetic resin, and is formed to be a long and slender rectangular parallelepiped as shown in FIG. 11 and FIG. 12, and the upper surface 155 of the casing 157 is opposed to the rear side 31*b* of the contact glass 31 (Refer to FIG. 5). As shown in the same drawings, the contact image sensor 156 differs from the contact image sensor 67 described above in that the connection portion 75 and the shaft receiving portion 152 are provided to be integral with the casing 157 of the contact image sensor 156.

In detail, as shown in FIG. 11 and FIG. 12, the connection portion 75 and the shaft receiving portion 152 are provided on the underside of the casing 157. The shaft receiving portion 152 is provided roughly at the middle in the longitudinal direction of the casing 157.

A pair of bosses 118 and 119 are provided at the middle of the casing 157. In the modified example structure, the respective bosses 118 and 119 are formed to be integral with the casing 157. The boss 118 is provided at one side 120 in the short direction of the casing 157, and the boss 119 is provided at the other side in the short direction of the casing 157. The respective bosses 118 and 119 are formed to be like a long and slender flat plate as shown in the same drawings, and protrude downward from the underside of the casing 157. Grooves 153 and 154 (served as the contact portion) extending in the short direction are formed at the lower end parts of the bosses 118 and 119. Further, since the shape of the groove 153 or 154 is formed to the same shape as that of the groove 87 described above, a detailed description thereof is omitted herein.

By fitting the grooves 153 and 154 onto the guide shaft 69, the casing 157 is supported by the guide shaft 69. That is, the contact image sensor 156 is supported by the guide shaft 69. Therefore, the shaft receiving portion 152 supported by the guide shaft 69 is composed by the portion in which the groove 153 of the boss 118 is provided and the portion in which the groove 154 of the boss 119 is provided. In addition, since the supporting structure using the grooves 153 and 154 by the guide shaft 69 has no difference from the structure of supporting the carriage 68 in the groove 87 in the example structure described above, a description thereof is omitted herein. By the shaft receiving portion 152 thus constructed being fitted onto the guide shaft 69, the contact image sensor 156 can be supported slidably in the direction of the arrow 158 directly by the guide shaft 69.

Further, the respective example structures are only examples of the present invention. The example structures may be appropriately modified in the scope not departing from the aspects of the invention. Therefore, in the respective example structures described above, the guide shaft 69 that is produced by sheet metal processing is illustrated. However, the guide shaft is not necessarily molded by sheet metal processing. Even in a case where a guide shaft whose appearance configuration is corresponding to the guide shaft 69 is molded by cutting or machining a steel material, a supporting structure of the carriage 68 using the corresponding guide shaft may be included in aspect of the invention.

Also, in the example structure, a mechanism by which the carriage 68 of the image-scanning unit 56 is slidably supported is illustrated, and in the modified example structure, a mechanism by which the casing 157 of the contact image sensor 156 is slidably supported is illustrated. However, the above-describe example structures may be applicable to a mechanism of slidably moving the ink-jet print head 39 on the guide rails 43 and 44 in the image-printing unit 24 described above.

What is claimed is:

1. A carriage moving device comprising:
- a guide member comprising a pair of inclined planes;
- a carriage slidably supported by the guide member in a longitudinal direction of the guide member at a plurality of portions where the pair of inclined planes slidably support the carriage.

2. The carriage moving device according to claim 1, wherein the guide member is disposed downward of the carriage.

3. The carriage moving device according to claim 1, wherein the plurality of portions is two portions.

4. The carriage moving device according to claim 1, comprising:
- a pair of projection portions being respectively in contact with the pair of the inclined planes at the plurality of portions.

5. The carriage moving device according to claim 4, wherein a contact portion comprises a pair of guard planes, each guard plane interposing the guide member in a width direction of the guide member.

6. The carriage moving device according to claim 1, wherein a contact portion comprises a pair of guard planes, each guard plane interposing the guide member in a width direction of the guide member.

7. The carriage moving device according to claim 1, wherein the guide member is formed by plastically deforming a metallic plate.

8. The carriage moving device according to claim 7, wherein the guide member has a substantially inverted V-shaped in a cross section thereof.

9. An image-scanning apparatus comprising:
- a carriage moving device comprising:
  - a guide member comprising a pair of inclined planes; and
- a carriage slidably supported by the guide member in a longitudinal direction of the guide member at a plurality of portions where the pair of inclined planes slidably support the carriage.

10. The image-scanning apparatus according to claim 9, wherein the plurality of portions is two portions.

* * * * *